Figure 1:
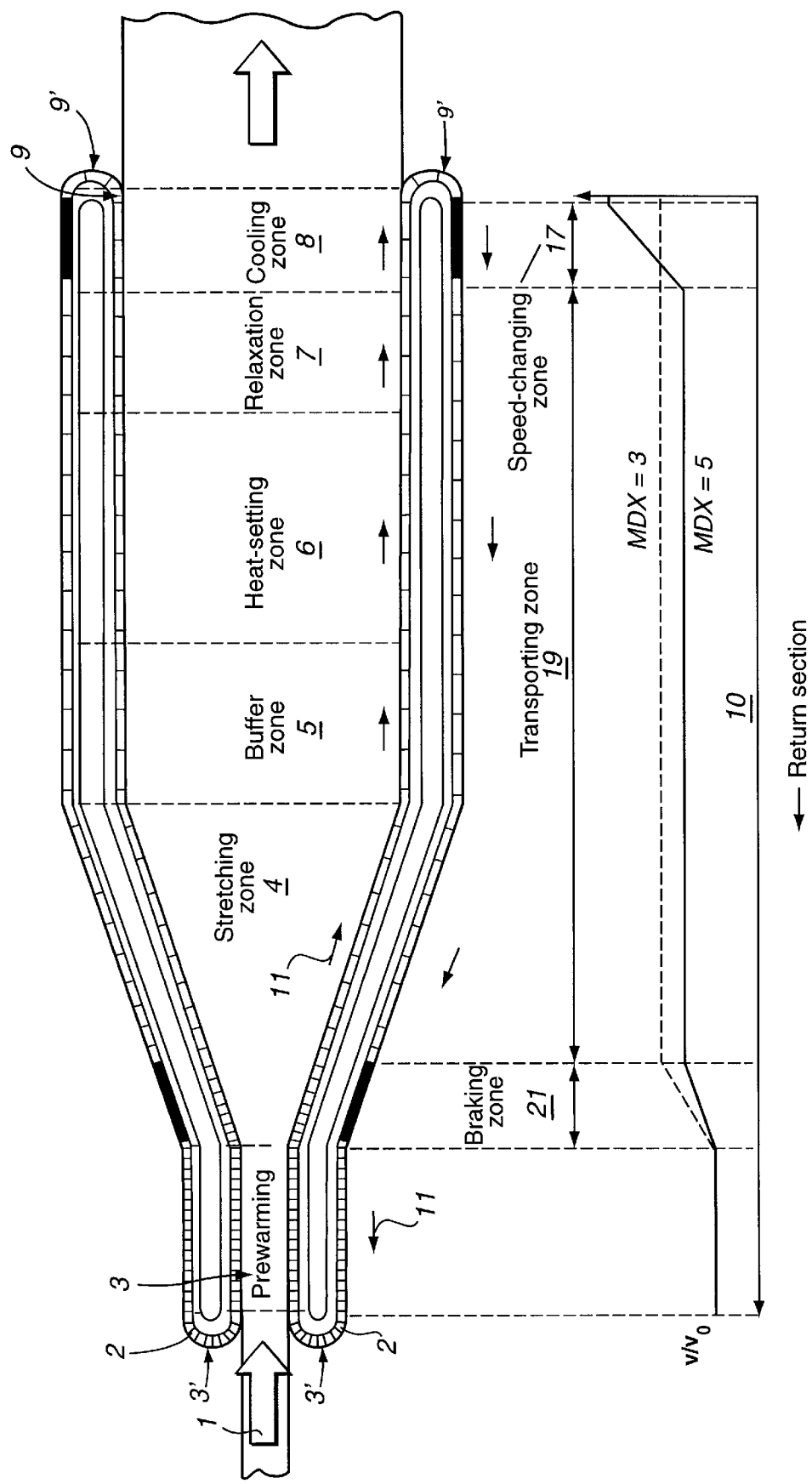

United States Patent
Oedl et al.

[19]

[11] Patent Number: 6,043,571
[45] Date of Patent: Mar. 28, 2000

[54] LINEAR-MOTOR-DRIVEN TRANSPORT INSTALLATION

[75] Inventors: Günter Oedl, Salzburg, Austria; Wolfgang Zintz, Vachendorf; Rudolph Kreiner, Inzell, both of Germany

[73] Assignee: Bruckner Maschinenbau GmbH, Germany

[21] Appl. No.: 09/068,223

[22] PCT Filed: Aug. 14, 1997

[86] PCT No.: PCT/EP97/04450

§ 371 Date: May 5, 1998

§ 102(e) Date: May 5, 1998

[87] PCT Pub. No.: WO98/10914

PCT Pub. Date: Mar. 19, 1998

[30] Foreign Application Priority Data

Sep. 12, 1996 [DE] Germany .......................... 196 37 201

[51] Int. Cl.[7] .................................................. H02K 41/00
[52] U.S. Cl. .............................. 310/12; 318/135; 318/38
[58] Field of Search .................... 310/12, 13, 14

[56] References Cited

U.S. PATENT DOCUMENTS

| | | | |
|---|---|---|---|
| 3,803,466 | 4/1974 | Starkey | 318/135 |
| 4,220,899 | 9/1980 | von der Heide | 318/135 |
| 4,769,580 | 9/1988 | Goetz et al. | 318/135 |
| 4,825,111 | 4/1989 | William et al. | 310/12 |
| 4,853,602 | 8/1989 | Hommes et al. | 318/38 |

FOREIGN PATENT DOCUMENTS 4427604 8/1996 Germany .

OTHER PUBLICATIONS

Colvin R: "Magnetic Linear Drive Increases Speed of Biaxial Orientation Unit" Modern Plastics International, Bd. 26, Nr. 3, Mar. 1, 1996, p. 26/27 XP000587688 see figure 3.

*Primary Examiner*—Nestor Ramirez
*Assistant Examiner*—Judson H. Jones
*Attorney, Agent, or Firm*—Nixon & Vanderhye PC

[57] ABSTRACT

In a linear-motor-driven transport installation, in particular a linear-motor-driven simultaneous stretching installation, the tenter-clip carriage return section (10) is divided into at least three zones, namely a first speed-changing zone (17), a following transporting zone (19) and a subsequent braking zone (21). The length of the speed-changing zone (17) and the braking zone (21) is together less than 40% of the overall length of the return section (10). Only in the speed-changing zone (17) and/or braking zone (21) are more powerful drive devices provided than in the other part of the return section (10), in order to subject the carriages there to a more intense change in speed.

13 Claims, 2 Drawing Sheets

LINEAR-MOTOR-DRIVEN TRANSPORT INSTALLATION

The invention relates to a linear-motor-driven transport installation, in particular a simultaneous stretching installation, in which linear-motor-driven carriages or tenter-clip carriages are advanced on a circulating track, and drive devices for carriages or tenter-clip carriages are provided, in particular for braking, on a return section of the track between a running-out zone and a running-in zone.

Linear-motor-driven transport installations, in particular stretching installations, are disclosed, for example, by U.S. Pat. No. 5,072,493, DE 29 30 534 A1, DE 195 10 281 C1 and U.S. Pat. No. 5,036,262 or U.S. Pat. No. 4,853,602.

These may concern synchronous, asynchronous or else hysteresis motor-operated linear drives.

As known, in such cases the circulating tenter-clip carriages are accelerated with increasing intensity from a running-in speed in the running-in zone in the following stretching zone, their distance from one another increasing. In a customary subsequent relaxation or setting zone, the speed of the tenter clips is reduced slightly with respect to the speed at the end of the stretching zone.

In the subsequent deflecting zone, and in particular on the return side, the tenter-clip carriages are again braked with increasing intensity down to the speed in the running-in zone.

To achieve appropriate film properties, during operation of the installation a specific speed profile is prescribed for the film side, in other words for the side on which the tenter-clip carriages grip the edge of the film, hold it securely and stretch it. Since it is intended that the speed of the installation can also be changed while production is in progress, and at the same time the number of tenter-clip carriages is constant during the operation of the installation, for this reason the following relationship must also hold even after a change in the speed profile $$\int_{x=0}^{x=L} (1/v)\,dx = const.$$

where x=position of the running carriage
L=length of an orbit
v=speed of a tenter-clip at the location x.

On the basis of this relationship, the process control system is capable of determining the necessary decelerations in the braking zone and the required speed in the transporting zone for each operating state.

Thus, since in the case of such transport installations the total number of tenter clips is prescribed and can be changed only when the installation is at a standstill and, moreover, the number of tenter clips on the process and film side is already prescribed by the prescribed process conditions (namely the longitudinal stretching ratio), the difference from the total number of tenter clips on the return side of the installation (after the tenter clips have released the edge of the film) must be set and changed on this basis, according to the installation conditions. To be able in this case to accommodate any number of tenter clips on the return side, the average distance between the tenter clips must be variable, this distance being defined by the speed profile, as is described inter alia in U.S. Pat. No. 4,825,111.

In the case of the apparatus shown in U.S. Pat. No. 4,825,111, each tenter clip on the return side runs through three regions. In the first region, the tenter clips travel at constant speed, which corresponds to the final film speed. Thereafter, the tenter-clip carriages are decelerated in one or more stages. In the third region, the tenter-clip carriages again travel at constant speed, which is equal to the running-in speed. To set the average distances between the tenter-clip carriages appropriately on the return side, the limits between the regions are shifted. For this purpose, corresponding motors, which are capable of braking the tenter clips and/or continuing to maintain the transport of the tenter clips, are provided over the entire length of the return.

Against this background, the object of the present invention is to take the prior art cited above as a basis and, in a linear-motor-driven transport installation, optimize the braking on a return section of the carriages advanced along the linear-motor-driven transport installation.

The present invention makes it possible to reduce the installed motor power on the return section by an optimized zoning. This allows the costs in the construction of a transport installation, and in the case of stretching installations in particular, as well as the energy expenditure required during the operation of such an installation to be reduced with respect to conventional solutions.

According to the invention, this is made possible by the fact that only as short a part as possible of the overall return section is equipped with powerful motors, in order to permit an appreciable deceleration on this comparatively short subsection. Equipping the entire return section, or virtually the entire return section, with such motors is no longer necessary.

According to the invention, for this purpose the return section is divided into at least three fixed ones, namely a first speed-changing zone, a transporting zone and a braking zone. In this case, the first speed-changing zone is generally also operated as a braking zone. Now, it is only for the first speed-changing zone (acceleration or braking zone) and the braking zone, designed as a third zone, that the specified motors for braking and decelerating (or accelerating) the linear-motor-driven carriages, and consequently for absorbing the corresponding forces, are necessary, and have to be designed for this. By contrast, the transporting zone may be designed only for overcoming the frictional forces, the transporting zone undertaking most of the return of the linear-motor-driven carriages or tenter clips in the direction of the running-in zone.

In a preferred embodiment of the invention, it is provided that, in adaptation to different speeds of the installation and/or stretching ratios thereof, the intense braking dependent thereupon of the linear-motor-driven carriages or tenter-clip carriages is performed in particular in the first speed-changing zone. However, the transporting speed of the entire system can also be differently set in the following transporting zone, in dependence on the longitudinal stretching ratio and the speed of the installation. In the second braking zone, the linear-motor-driven carriages or tenter clips are preferably always braked to an identical advancing speed profile and transported further, irrespective of the speed of the installation and, in particular in the case of a stretching installation, the longitudinal stretching ratio.

Finally, it is also pointed out that the linear-motor-driven carriages or tenter-clip carriages could be accelerated once again to a higher speed in the first speed-changing zone, then to be decelerated to running-in speed in the braking zone mentioned. This would have the advantage that a smaller number of tenter clips would be necessary in systems on account of the higher average speed of the tenter clips during circulation. In this case, however, the intense deceleration in the then only braking zone could lead to excessive mechanical loads on the linear-motor-driven carriages or tenter-clip carriages, in particular whenever a final braking takes place in the braking zone by the linear-motor-driven carriages or tenter clips abutting or colliding.

The drive devices in the speed-changing zone and/or braking zone preferably comprise powerful linear motors, in particular synchronous linear motors. Since synchronous linear drives have significant benefits in the stretching zone and it is of advantage, inter alia for reasons of cost-effectiveness, to provide a consistent drive principle throughout the entire installation, it is expedient to provide the synchronous drives also on the return section. Alternatively, it is also readily possible, however, to use linear drives which operate on the asynchronous or hysteresis motor principle.

The invention is explained in more detail below with reference to an exemplary embodiment. In the drawing, FIG. 1 shows a diagrammatic plan view of a transport installation with a speed diagram for the return section, and FIG. 2 shows a diagram to explain the speed of the tenter clips over the entire circulation.

Figure 2:
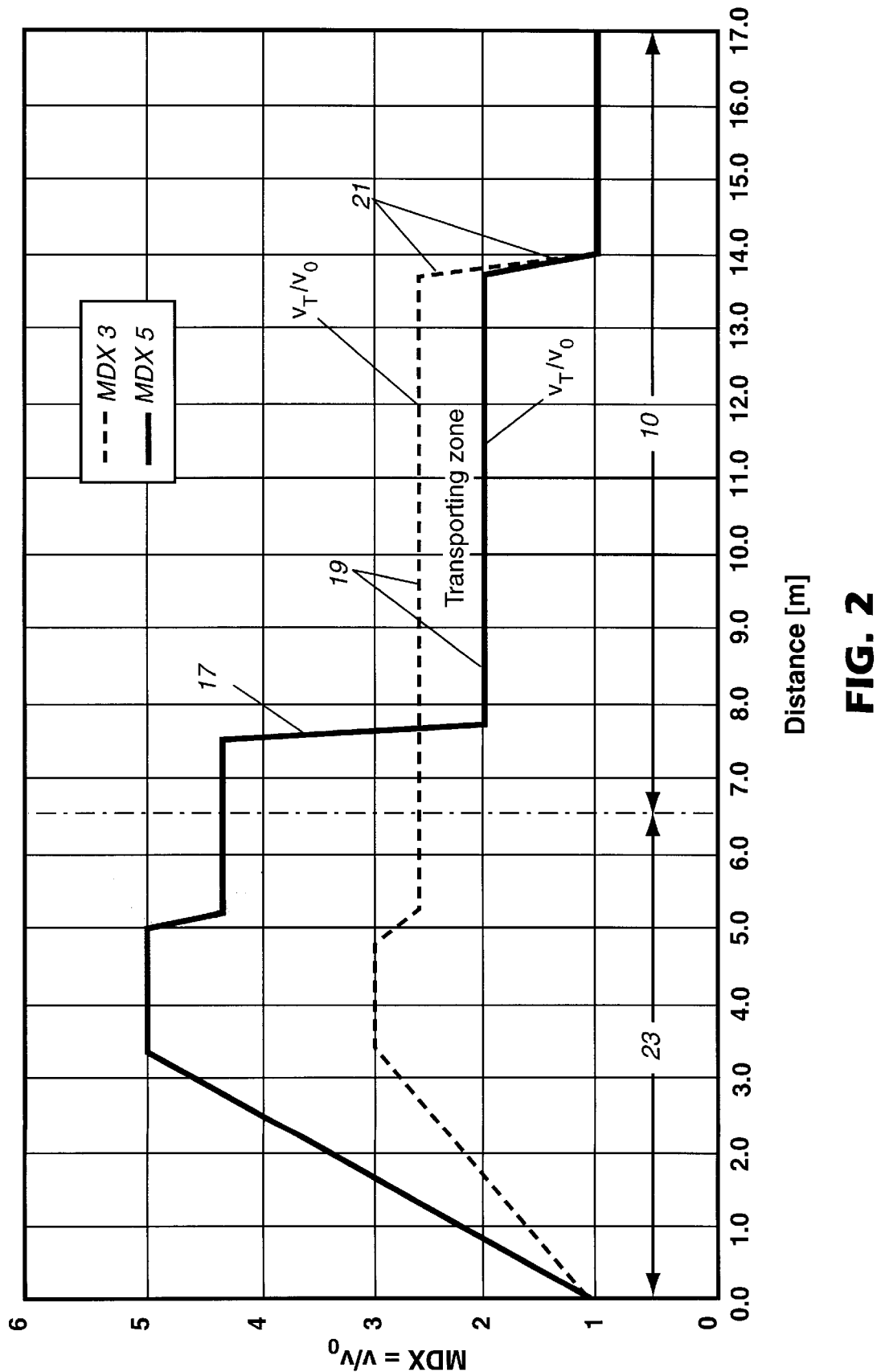

In FIG. 1 there is shown in a schematic plan view a transport installation with two closed tenter-clip circulating tracks 2, which are arranged symmetrically with respect to a centre longitudinal axis of the installation. The tenter-clip circulating tracks 2 serve for guiding tenter-clip carriages (not shown), which circulate in the direction of arrow 11 and carry tenter clips, which are used for gripping and transporting a film of plastic 1. The film of plastic 1, usually coming from a slot die via a chill roll, is fed on the input side of the transport installation to a running-in zone 3, where the film of plastic 1 is gripped by the tenter clips and a prewarming takes place. After the running-in zone 3, the film of plastic 1 is stretched simultaneously in the longitudinal and transverse directions in a stretching zone 4. Thereafter, the film of plastic 1 is kept at the same temperature for a certain dwell time in a so-called buffer zone 5, then to be heat-set for a brief time at a relatively high temperature in a heat-setting zone 6. In the following relaxation zone 7, the film of plastic 1 can then relax slightly in both axes. This is achieved by a slightly converging rail position of the tenter-clip circulating tracks 2, the distance between the tenter clips at the same time being reduced. Thereafter, the film of plastic 1 is cooled in a cooling zone 8 in a cold air stream. At the running-out end 9, the stretched film of plastic 1 is then released by the tenter clips and taken over by rolls (not shown) for the further process.

Coming from the running-in zone 3, the advancement and acceleration of the tenter-clip carriages takes place by means of linear motors in the zones 4 to 8 mentioned above, as described inter alia in the prior publications cited at the beginning, reference to the full disclosure of which is made.

A following return section 10 is understood in the broader sense to mean the distance over which the linear-motor-driven carriages or tenter-clip carriages move back from their running-out end 9, in which they have released the clamped-in edge of the film of plastic, as far as the running-in zone 3.

In the narrower sense, the return section 10 is understood to mean the substantially straight distances between the deflecting region 9' of the running-out end 9 and the deflecting region 3' of the running-in zone 3.

This return section 10 is now divided into at least three further zones, namely a first speed-changing zone 17, which in a first exemplary embodiment is designed as a first braking zone, a following transporting zone 19 and a subsequent further, second braking zone 21.

Only in the first and second braking zones 17, 21, over a comparatively short distance in relation to the overall return section 10, are correspondingly powerful braking motors provided, in order to carry out the correspondingly necessary deceleration and braking of the tenter clips running in at relatively high speed.

Linear motors in particular may be used as braking motors. As an alternative or in addition to such linear motors, however, mechanical or contactless eddy-current brakes may also be used for decelerations.

An eddy-current brake may be designed, for example, in such a way that a reaction surface made of electrically and magnetically conducting materials, for example a composite of a copper plate and a steel plate, is fitted on the moved tenter-clip carriage. In this case, permanent magnets or electromagnets would be fitted on the stationary part of the transport system. The braking force can then be set, for example by changing the distance between the magnet and the moved reaction part. In the case of an electromagnet, this may take place by controlling the coil current.

The increased force of the linear motors during deceleration of the tenter-clip carriages in the first and second braking zones 17, 21 (or during acceleration in the first speed-changing zone 17 according to a design variant) may also be achieved by adding further primary parts, which act on corresponding effective surfaces of the individual tenter-clip carriages. For example, it is possible to provide an arrangement of such primary parts on both sides in the two braking zones 17, 21, while the transporting zone is provided with primary parts only on one side, for example only at the bottom. A double-sided arrangement of the linear drives has the effect of increasing the braking capacity in the braking zones 17, 21 by 100% with respect to the transporting zone 19.

A speed diagram is represented in a schematic way in FIG. 2, the entire distance covered by a circulating tenter-clip track being reproduced on the X axis and the ratio of the current tenter-clip speed v to the tenter-clip running-in speed $v_0$ being plotted as MDX on the Y axis. Two different profiles are represented, namely a continuous speed profile MDX5 with relatively high stretching ratios and relatively high tenter-clip carriage speeds, in particular at the end of the stretching zone 4. The second speed profile MDX3, plotted in FIG. 2 by dashed lines, shows another setting of the installation with relatively low stretching values and relatively low maximum tenter-clip speeds.

Furthermore, in the diagram according to FIG. 2, the so-called film side, i.e. the distance from the running-in zone 3 to the running-out end 9 over which the tenter-clip carriages grip the edge of the film of plastic 1, hold it securely and advance it, is provided with the reference numeral 23. The then adjoining speed profile in the return zone 10 is also depicted on the lower side in FIG. 1, for the sake of clarity, in order to illustrate the assignment to the individual zones. Furthermore, it should be noted that the figures specifying lengths on the X axis in FIG. 2 relate only to a greatly shortened test installation. The transport installations customarily used in practice normally have much longer circulating distances.

It can be seen from FIG. 2 that, beginning from the running-in zone 3, the speed increases in the stretching zone 4 up to a maximum speed, is then kept constant over a certain distance, to be reduced again slightly in the relaxation zone 7.

On the return section 10, the tenter clips are then intensely braked, according to speed profile MDX 5, in the first braking zone 17 by the installed motors provided there, to be precise down to a speed $v_T$, i.e. of [sic] the speed in the transporting zone 19.

In the transporting zone 19, instead only linear-motor drives of a low rating are provided, to which there has to be supplied only as much energy as it takes for the frictional forces of the advanced tenter-clip carriages to be overcome and for it to be possible for the tenter-clip carriages in the exemplary embodiment shown to be advanced at virtually constant speed in an orderly manner as far as the next braking zone 21.

In the second braking zone 21 as well, there are likewise further powerful motors installed over a comparatively short distance, in relation to the overall return section 10, which then perform a further comparatively abrupt braking down to the running-in speed $v_0$ or only slightly above it.

The length of the first and second braking zones 17 and 21, respectively, in relation to the overall length of the return section 10, is in each case less than 20% of the overall length of the return section 10, preferably even less than 10%. In the exemplary embodiment shown, the length of the first or second braking zone 17, 21, in relation to the overall length of the return section 10, is less than 5%. In absolute values, this means that the length of the first or second braking zone 17, 21 is in each case only 2 m, for example, it also being possible for this length to be made much shorter than 2 m, for example 1 m or 0.5 m. Powerful motors with an effective length in relation to the return section of less than 50 cm, 40 cm or 30 cm are possible.

In particular in the case of the second diagram, shown by dashed lines, it can be seen that, on account of the lower tenter-clip speeds at the end of the stretching zone 4 and in particular in the region of the relaxation zone 7, if appropriate it is even possible to dispense entirely with any braking of the tenter-clip carriages in the first braking zone 17, in order to feed the tenter-clip carriages from the relaxation zone 7 at more or less identical constant speed over the transporting zone 17 to the second braking zone 21. In the region of the second braking zone 21, the tenter-clip carriages are then braked to the previously mentioned running-in speed $v_0$ in the case of this exemplary embodiment as well.

By changing the speeds of the installation and the stretching ratio, i.e. in particular the longitudinal stretching ratio, even when the installation is running, the appropriate braking of the tenter-clip carriages in the first and second braking zones and the setting of a specific speed profile in the transporting zone can be automatically performed and adapted by the system control.

As a departure from the speed profiles reproduced in the diagrams according to FIG. 2 and FIG. 1, it is also conceivable in principle for the tenter-clip carriages to be accelerated once again to a higher speed, for example in the first zone 17 (which is therefore to be referred to generally not as a braking zone but as a speed-changing zone), then to be decelerated again in the second braking zone 21 from their speed in the transporting zone 19 to the running-in speed. This has the advantage that, on account of higher average speeds of the tenter-clip carriages during a circulation, only a smaller number of tenter clips are necessary in the overall system. However, with a given overall length of the circulating track, the use of a comparatively higher number of tenter-clip carriages is to be preferred by the tenter clips, in order that the deceleration in the second braking zone 21 does not have excessive values. This is so since the second braking zone 21 in particular can be designed in such a way that the braking to the running-in speed is brought about by mechanical striking of an abutting tenter-clip carriage against a previously braked tenter-clip carriage, whereby these violent collisions can of course cause comparatively great mechanical loads to occur.

We claim:

1. Linear-motor-driven transport installation, in particular a linear-motor-driven simultaneous stretching installation, in which linear-motor-driven carriages or tenter-clip carriages are advanced on a circulating track, drive devices for the carriages or tenter-clip carriages being provided, in particular for braking, on a return section between a running-out zone and a running-in zone, characterized in that the return section has at least three zones, namely, seen in the running direction, a first speed-changing zone, a following transporting zone and a subsequent braking zone, the length of the speed-changing zone and the braking zone together being less than 40% of the overall length of the return section, and in that in the speed-changing zone and/or braking zone more powerful drive devices are provided in comparison with the other part of the return section, in order to subject the carriages or tenter-clip carriages there to a more intense change in speed, wherein mechanical or contactless eddy-current brakes are provided as an alternative or in addition to linear motors in the speed-changing zone and/or braking zone, and wherein the eddy-current brake comprises a stationarily fitted permanent magnet or electromagnet which interacts with braking elements made of electrically conducting and/or ferromagnetic material which are fastened to the carriage.

2. A linear-motor-driven transport installation comprising:
   a continuous circulating track having a running-in zone, a running-out zone and a return section extending between said running-out zone and said running-in zone;
   a plurality of linear-motor-driven carriages or tenter-clip carriages for being advanced on the circulating track;
   drive devices for the carriages including drive devices for braking the carriages on at least a portion of said return section, wherein
   the return section has at least three zones including, in a carriage advancing direction, a first-speed changing zone, a following transporting zone, and a subsequent braking zone, a length of the speed-changing zone and a length of the braking zone together being less than 40% of the overall length of said return section and wherein the drive devices is provided in at least one of the speed-changing zone and braking zone are more powerful than drive devices provided in a remainder of the return section thereby to subject carriages to a more intense change in speed in said at least one of the speed-changing zone and braking zone than in the remainder of said return section, wherein said carriages are braked in at least one of said speed-changing zone and said braking zone and wherein said carriages are braked along said return section to a minimum speed of greater than zero.

3. A transport installation according to claim 2, wherein the length of the speed changing zone and the length of the braking zone are each less than 20% of the overall length of the return section.

4. A transport installation according to claim 3, wherein the length of the speed changing zone and the length of the braking zone are each less than 10% of the overall length of the return section.

5. A transport installation according to claim 4, wherein the length of the speed changing zone and the length of the braking zone are each less than 5% of the overall length of the return section.

6. A transport installation according to claim 2, wherein said carriages are selectively braked at both said speed-changing zone and said braking zone.

7. A transport installation according to claim 2, wherein said more powerful drive devices comprise synchronous linear motors.

8. A transport installation according to claim 2, wherein at least one of mechanical and contactless eddy-current brakes are provided in at least one of the speed changing zone and braking zone.

9. A transport installation according to claim 8, wherein the eddy-current brake comprises a stationarily fitted permanent magnet or electromagnet which interacts with braking elements made of at least one of electrically conducting and ferromagnetic material fastened to said carriages.

10. A transport installation according to claim 7 wherein additional primary parts, which act on corresponding effective surfaces of the carriages and in this region increase the force of the linear-motor arrangement, are provided along the path of movement of the carriages.

11. A transport installation according to claim 2, wherein at least one drive device is provided in the transporting zone for advancing carriages in the transporting zone at a substantially constant speed to the braking zone.

12. A transport installation according to claim 2, wherein a capacity of the more powerful drive device is 100% greater than drive devices in the transporting zone disposed between said speed-changing zone and said braking zone.

13. A transport installation according to claim 2, wherein the following relationship holds throughout the length of said circulating track:

$$\int_{x=0}^{x=L} (1/v)dx = \text{const.}$$

where $x$ = position of the running carriage $L$ = length of an orbit $v$ = speed of a tenter-clip at the location $x$.

* * * * *